United States Patent [19]

Blankenship

[11] Patent Number: 5,351,175

[45] Date of Patent: Sep. 27, 1994

[54] INVERTER POWER SUPPLY FOR WELDING

[75] Inventor: George D. Blankenship, Chardon, Ohio

[73] Assignee: The Lincoln Electric Company, Cleveland, Ohio

[21] Appl. No.: 14,261

[22] Filed: Feb. 5, 1993

[51] Int. Cl.⁵ ............................................. B23K 9/10
[52] U.S. Cl. ...................................... 363/16; 363/71; 363/97; 363/131; 219/137 PS
[58] Field of Search .......... 219/130.1, 130.21, 137 PS; 363/15, 16, 20, 21, 65, 71, 95, 97, 131

[56] References Cited

U.S. PATENT DOCUMENTS

| | | | |
|---|---|---|---|
| 4,564,742 | 1/1986 | Karlsson | 219/130.1 |
| 4,897,522 | 1/1990 | Bilczo et al. | 219/130.32 |
| 5,088,017 | 2/1992 | Yaginuma et al. | 363/21 |
| 5,229,928 | 7/1993 | Karlsson et al. | 363/65 |

Primary Examiner—Jeffrey L. Sterrett
Attorney, Agent, or Firm—Vickers, Daniels & Young

[57] ABSTRACT

A high frequency power supply for supplying a welding current through a choke to a welding station including an electrode element and a workpiece element. The power supply includes a first transformer with a first core and means for receiving on said first core a first secondary winding with the first core being magnetized in a first flux direction upon creation of first current pulse and a second transformer with a second core and means for receiving on said second core a second secondary winding with said second core being magnetized in a second flux direction upon creation of a second current pulse in the direction opposite to the first pulse. The first transformer is operated by a first capacitor means for applying a first voltage to the first transformer upon operation of a first switch means and the second transformer is operated by a second capacitor means for applying second voltage to the second transformer upon operation of a second switch means. A single rectifier charges the first and second capacitor means to a given total voltage and control means are provided for maintaining said first and second voltages generally equal.

15 Claims, 2 Drawing Sheets

INVERTER POWER SUPPLY FOR WELDING

The present invention relates to the art of high frequency inverters of the type used as power supplies for arc welding operations and more particularly to an improved high frequency power supply to supplying a welding current through a choke to a welding station, including an electrode element and a workpiece element.

INCORPORATION BY REFERENCE

Bilczo 4,897,522 is incorporated by reference herein to illustrate the type of power supply to which the present invention is directed. This prior patent makes it unnecessary to repeat the background information contained therein to explain details of the background of the present invention.

BACKGROUND

This invention is particularly applicable for high frequency inverter used for DC welding, wherein a rectified D.C. power supply is ultimately switched to produce alternate polarity output pulses in the secondary of a transformer means, wherein the output pulses are rectified and directed across the electrode element and workpiece of the welding station for the purposes of performing a welding operation. The present invention is described with reference to this use of a specific inverter; however, the invention has broader applications and may be used with various high frequency inverters of the type creating a series of current pulses which create current directed across the electrode and workpiece of a welding station for the purposes of performing a welding operation. In accordance with the preferred application of the invention, the switching operation is accomplished by two separately and alternately operated switch means, such as FET's, wherein one switch means is activated to magnetize the core of a transformer to produce an output current pulse in the secondary of the transformer and the other switching means is employed for creating a separate opposite polarity output current pulse at the secondary of the transformer. By alternating switching the operation of the two switch means, high frequency alternating current is magnetically coupled into two secondary windings of the transformer. This high frequency current in the form of pulses is directed by rectifying means, such as high speed diodes, through electrical filtering means, such as an inductor or choke, to the output terminals of the D.C. welder.

The secondary stage of the output transformer for an inverter, of the type to which the present invention is particularly directed, has two secondary windings in which are created current pulses that are separately rectified. When the output of the transformer is driven by a first primary winding, there is a pulse of current created in a first electrical polarity in the power supply. A pulse of the opposite electrical polarity is then created in the second secondary winding at the output of the transformer of the power supply by a pulse in a second primary winding. These opposite polarity current pulses are directed through the high speed diodes to the welding station. High frequency electrical current pulses of proper polarity are thus directed toward the inductor or choke of the welder, through the inductor or choke to the output terminals of the D.C. welder.

The first and second switch means for creating the first and second current pulses are controlled by electrical trigger or gate pulses of a selected pulse time or pulse width and repetition rate. To control the magnitude of the welder output current or voltage, the width, or spacing, of the trigger pulses is varied to vary the output current across the electrode and workpiece of the welding station or installation. As more current is required for the welding operation, the width of the pulses for energizing the primaries of the transformer is increased in proportion to the desired increase in the output current. The current is normally controlled by a feedback circuit for the inverter by use of a voltage controlled pulse width modulator circuit operated at a selected frequency, such as 20 kHz. These modulators are commonly used in electrical switch mode inverter power supplies and are available in the form of standard integrated circuit packages familiar to those skilled in the art. The selected frequency of operation affects the response time of the welder to the feedback current signal or senses voltage signal and, thus, affects the ability of the welder to respond to small changes in the welding arc. A high frequency, above approximately 10 kHz, is necessary to provide substantial improvement in performance of the inverter. The frequency of operation also affects the audibility of the arc and the welding circuitry. To minimize objectionable noise and improve operator appeal a frequency above approximately 20 kHz is normally chosen.

In accordance with the invention of Bilczo U.S. Pat. No. 4,897,522, the high frequency inverter to which the present invention is particularly directed, is modified by the inclusion of a booster winding on the output of the power transformer for providing additional voltage to extend the operating current range of the inverter. The input or primary windings for the power transformer tend to saturate the core of the tightly coupled transformer design where pulses in one direction have a different time duration than pulses in the other electrical direction. By having different current flows through the transformer, the D.C. component is created in the core causing a large D.C. current to flow. This current flow results in a large ampere-turn product and forces the D.C. flux in the transformer to increase for saturation of the transformer core. Consequently, the novel design in Bilczo, although highly advantageous over known structures, still presented a problem in obtaining appropriate utilization of the ferrite core material of the transformer. Further, the prior power supply was somewhat unstable at lower welding currents and presented some difficulties with respect to starting of the welding operation.

THE INVENTION

Disadvantages experienced in high frequency inverter type power supplies of the type defined above have been overcome by the present invention which relates to a high frequency inverter type power supply including a transformer for creating a first current pulse in a first secondary winding and a second current pulse in a secondary winding and means for connecting the secondary windings to pass the two opposite polarity pulses through the choke and across the elements forming the welding station. In the present invention the transformer means includes, in essence, two separate output transformers. The first transformer has a first core and means for receiving, on the first core, the first secondary winding of the power supply. The second transformer with a separate and distinct second core and means for receiving, on the second core, the second secondary winding of the power supply. By providing a separate core for the transformer means of the power supply, two separate and distinct primaries are wound on the separate cores. These windings are separated and are not mutually coupled.

The power supply is provided with a normal input stage of a three phase rectifier having an output capacitor. When two separate and distinct transformers are provided for the purpose of insuring operation of the individual current pulses, the input stage of the inverter comprises two separate transformers. Consequently, the total D.C. voltage from the rectifier is applied across two output capacitors connected in series. One of the capacitors drives one transformer to create a current pulse in one direction and the other capacitor drives the other transformer for creating a current pulse in the opposite direction. Pulse width modulators control the width of the individual, opposite polarity current pulses. As a higher current demand is required, the pulse from the width modulators driving the input switches have greater output widths. To control the amount of current flowing in opposite directions during each current pulse, there is a current command signal which is indicative of the desired current to flow through the welder. This current demand signal is compared with a feedback current signal indicative of the actual current flow to modulate and change the width of the individual pulses between the two separate and distinct transformers forming the output stage of the inverter. The pulse width modulators are operated at a high frequency so that pulses are still relatively narrow. By having narrow pulses, a rapid response is provided for the welder. By rapid changing of the current command signal, substantial instantaneous changes can occur in the welding cycle by immediate changes in the output current by changing the rapidly created current pulses of opposite polarity. The voltage across the two input capacitors driven by the single three phase rectifier has a known value. It has been found that the voltage on each of the input storage capacitors must be the same and substantially one-half of the total output voltage of the rectifier. Imbalance between the two input capacitors directing current from the rectifier to the switching means for the individual transformers can cause catastrophic failure of the power circuit itself. Consequently, the present invention relates to the concept of balancing the voltage across both input capacitors for the individual separate transformers so that the voltage across the capacitors is generally equal.

The primary objective of the present invention is to allow the use of two separate and distinct transformers which have separate cores to create the opposite polarity current pulses in the output of a high frequency inverter while preventing inefficiencies and damage to the inverter. This objective is accomplished, in accordance with the present invention, by positively controlling the voltage across the first and second input capacitors so that the voltages are generally equal. Generally equal refers to an attempt to make the two voltages of the capacitor equal and generally one-half of the output voltage of the rectifier.

In accordance with the invention, the capacitor voltage of one stage of the dual transformer inverter is subtracted from a nominal value which is dependent upon the actual value of the voltage across the output of the rectifier. As an example, when the output voltage is approximately 650 volts, a reference voltage of 325 volts is employed. The actual voltage across the first capacitor is compared to this reference voltage and the difference manifested as an error signal. This error signal is employed for the purpose of modifying the input current command signal for the portion of the inverter defined by the capacitor being measured. If the controlled capacitor has a voltage higher than the reference voltage, more current is produced by that particular stage of the two stage inverter. When more current is produced by one stage, a corresponding less current is provided by the second stage defined by the second output transformer, since there is a natural inverse relationship between the input capacitor voltages. If the voltage sensed across one capacitor is too low, the section of the inverter being monitored produces less current. Consequently, the other section of the inverter produces a higher current. This action balances the voltages across the capacitor to maintain a uniform operation of the inverter.

It has been found that when the current pulses are relatively short, the two capacitors driving the individual transformers of the inverter tend to have substantially different voltages even though the total voltage across both capacitors is somewhat constant. In addition, the output of an inverter is generally controlled so that the same amount of current flows both in a positive and negative directions during the opposite polarity pulses through the output of the inverter. This control feature also causes the voltages of the input capacitors to be substantially different. Difference in the voltage across the capacitors driving the individual transformers of the inverter reflect energy back into the primary section of the inverter and decreases the efficiency substantially. The present invention corrects this problem by controlling the balance of the two capacitors in the rectifier section for the two separate transformer sections of the somewhat standard high frequency inverter. This correction of the voltage across the capacitors is accomplished by comparing the voltage of one of the capacitors at a summing junction to a reference which is set at approximately half of the desired total voltage across the two input capacitors. The difference between the reference voltage signal and the actual voltage across the capacitor is employed as an error signal to add or subtract from the current command signal into the inverter. In practice, this 50% control voltage is obtained by detecting the actual total voltage across input capacitors and a circuit for dividing this detect voltage by two. Either fixed or real time control is possible on the capacitor voltage. This corrected current command signal is then used to balance the amount of current and, thus, the voltage across the capacitor of one stage of the inverter which, in turn, controls the voltage across the other input capacitor. Consequently, to obtain the advantage of having two separate transformers forming the output of the high frequency inverter, the present invention maintains the high efficiency of the inverter operation.

In accordance with the present invention a high frequency inverter of the type employing two separate output transformers includes a control means for maintaining the voltages across the input capacitors during the individual transformers at a generally equal value. This allows the operation of a two stage high frequency inverter wherein the pulse width modulators can operate rapidly without drastically affecting the efficiency or the loads placed upon the input stage of the inverter.

The preferred embodiment of the invention utilizes two separate transformer sections forming the output of a high frequency inverter. In this instance, the capacitors for driving the pulses from the output of the rectifier have a voltage substantially equal to ½ of the output voltage of the rectifier. It is also possible to employ four inverter sections and allow the control voltage of each of the sections to be approximately 25% of the total voltage at the output of the rectifier. In all instances, the separate sections forming reverse polarity current pulses are operated independently. This is accomplished by separate and distinct transformers and associated switching devices, which cause problems with the input side of the power supply. These problems are corrected by implementation of the present invention.

The primary object of the present invention is the provision of a high frequency power supply of the type including two, or four, separate transformers for creating opposite polarity current pulses at a high rate, which high frequency power supply does not have a reduced efficiency at the input stage based upon the split load at the output transformer.

In accordance with still a further object of the present invention, there is provided a high frequency power supply of the inverter type, as defined above, which power supply can respond rapidly with short current pulses to provide a fast response by the output welder to current commands directed to the power supply.

Yet another object of the present invention is the provision of a high frequency inverter type power supply, as defined above, which power supply can be used with a program controlled welder to provide rapid response during a welding cycle without drastically affecting the efficiency of the inverter power supply.

These and other objects and advantages will become apparently from the following description.

PREFERRED EMBODIMENT

Figure 1:
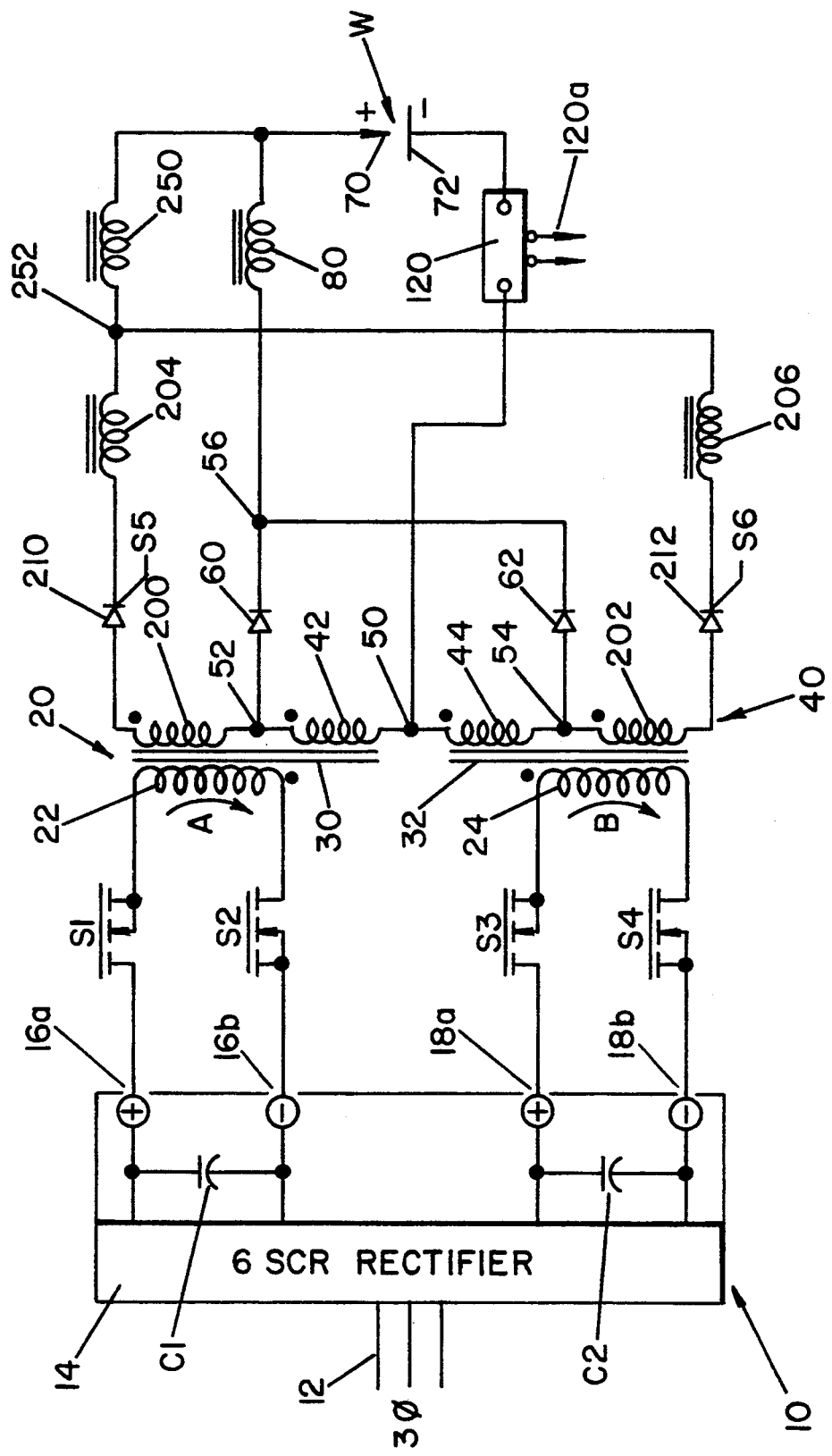
FIG. 1 is a wiring diagram of an inverter of the type to which the present invention is particularly directed with an output stage having two separate transformers driven by individual current pulses from separate capacitors; and, FIG. 2 is a wiring diagram of the preferred embodiment of the present invention for controlling the voltage across the individual capacitors shown in FIG. 1.

Referring to the drawings wherein the showings are for the purpose of illustrating a preferred embodiment of the invention and not for the purpose of limiting same, FIG. 1 shows a high frequency inverter 10 of the type having a three phase input 12 and a three phase bridge rectifier 14 to develop a D.C. output illustrated as two separate sets of output terminals 16a, 16b and 18a, 18b. The two sets of output terminals are representative in nature to show power supplied to the output stage, from two capacitors C1, C2 each having a given voltage determined by the total output D.C. voltage of rectifier 14. The capacitors supply power to the output circuit in the form of dual output transformer 20, having first primary winding 22 of a first transformer A and second primary winding 24 of a second transformer B. The separate transformers cause input current flow in the opposite directions also identified by A and B from capacitors C1, C2. In this embodiment one winding is used to magnetize core 30 and a separate winding is used to magnetize the core 32. Two sets of switching devices S1, S2 and S3, S4 are employed for the purpose of creating a first pulse to magnetizing core 30 and then magnetizing core 32 of transformer means 20 by creating a second pulse. Switching devices S1–S4 are illustrated as FET's. Actuation of devices S1, S2 causes a first current pulse to flow in the direction A through the first primary winding 22. In a like manner, closing, or actuation, of the switches or switching devices S3, S4 causes a second current pulse to flow in the direction B through second primary winding 24. In this manner, cores 30, 32 are alternately magnetized by alternate operation of the switching sets. This action causes induced voltage in the winding of the secondary or output stage of inverter 10 comprising a secondary winding 40, shown as divided into separate sections 42, 44. These sections can be individual windings or sections of a single winding, since they are polarized in the same direction. Winding 42 is the secondary of first transformer A. In a like manner winding 44 is the secondary of second transformer B. A tap at the center of winding 40 is a common junction 50. Spaced winding ends 52, 54 constituted the output stage for the inverter before incorporating the invention disclosed in Bilczo 4,897,522. Rectifying diodes 60, 62 cause a D.C. output between common junction or tap 50 and a common output terminal 56 for receiving current flow from terminals 52, 54. D.C. current between tap 50 and terminal 56 flows through the welding station W, comprising electrode element 70 and workpiece element 72. Pulses of current between junction or tap 50 and terminal 56 are filtered through a standard choke 80, to be explained later, and applied across welding station W.

Figure 2:
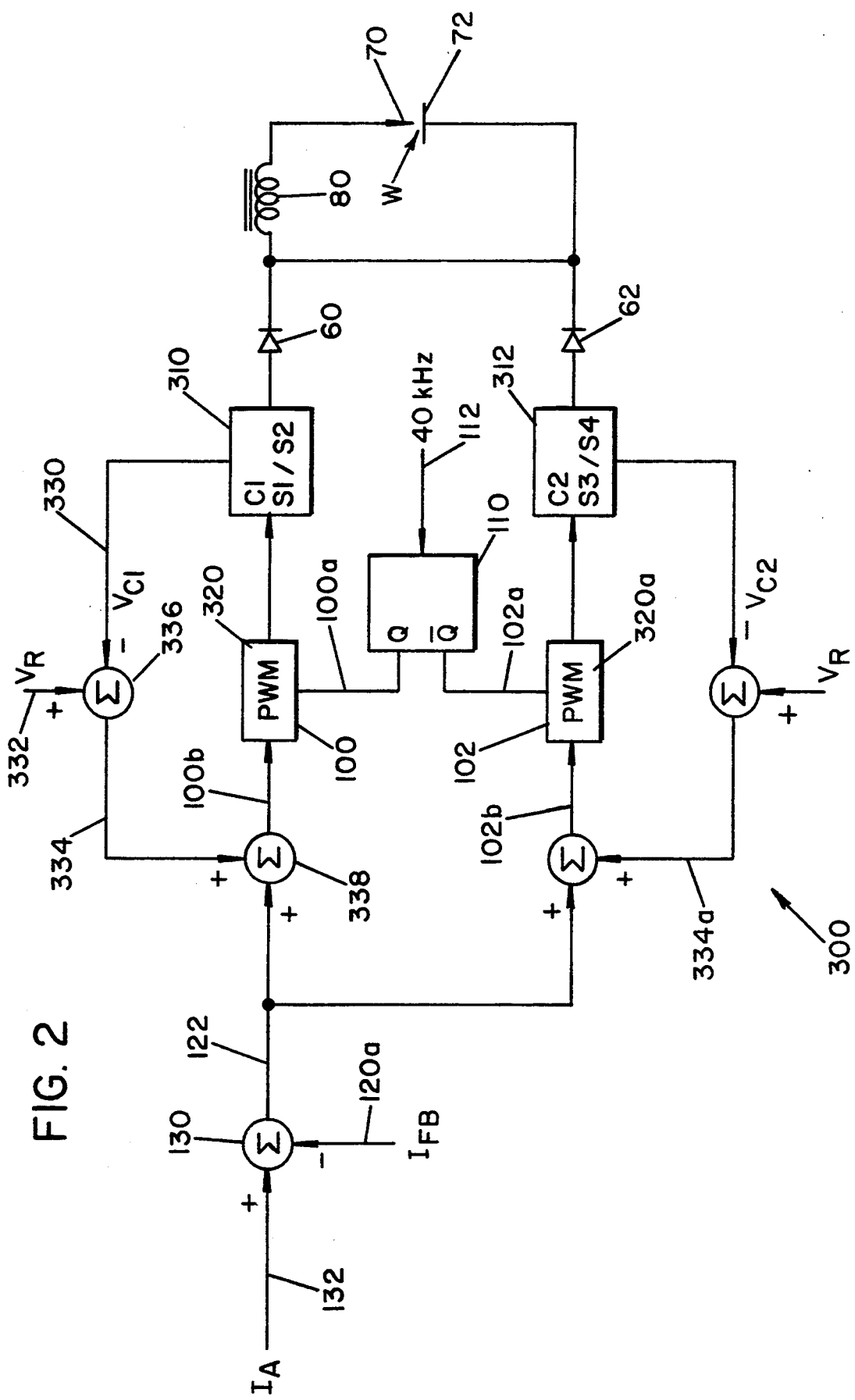

To synchronize the actuation of the two sets of switchable devices S1–S4, there is provided a standard trigger or gating circuit controlled in a pulse width modulation mode. As shown in FIG. 2, a sequencing clock 112 operates with a frequency of 40 kHz to drive a flip/flop 110. The outputs of the flip/flop are line 100a, 102a operated out of phase by 180°. Circuit 100, 102 includes output or gates adapted to produce actuating signals for switching devices S1–S4, respectively. During the first operating phase, a gate signal or trigger pulse on output 100a actuates switches S1, S2, in unison, causing a first current pulse to flow in the direction A through winding 22 of the first transformer. Thereafter, the actuating gate signals on output 100a are removed and gate signals are generated on outputs 102a. These signals or trigger pulses actuate switches S3, S4 to cause magnetizing current pulse to flow in the direction B through winding 24 of the secondary transformer, as shown in the drawing. The pulses at output 100a and then at output 102a are generated at a pulse rate of 20 kHz. The width of the pulses is varied by current command signs on lines 100b, 102b to control the output current in the welding station. In a constant current welding mode this is generally accomplished by sensing current flow in the output circuit by a detector, such as shunt 120. The sensed current controls circuits 100, 102 by changing the pulse width in accordance with the voltage on schematically illustrated line 122. The voltage on this line is an error signal from amplifier 130 that compares the actual current sensed in line 100a and the desired current signal in line 132. As the current decreases as sensed in line 120a, the voltage on line 122 decreases and the width of the trigger pulses for FET S1–S4 increases in accordance with standard pulse width modulation concepts.

The high frequency inverter 10 includes auxiliary voltage boosting secondary windings 200, 202. These windings are connected in series with secondary winding sections 42, 44. In practice, each of these windings is comprised of enough turns to increase the maximum output voltage to about 110 volts. These auxiliary windings are in series with current control circuits including current limiting inductors 204, 206, respectively. Of course, a resistor could be used for current limiting purposes; however, chokes 204, 206 are more efficient than resistors because they generate less heat. Unidirectional devices 210, 212 are coordinated with diodes 60, 62 to rectify the output currents of the auxiliary current windings 200, 202. Unidirectional devices 210, 212 are illustrated as SCRs S5 and S6, respectively. SCRs would provide the capability of selectively implementing the auxiliary current windings 200, 202. By using the auxiliary secondary windings, the current characteristic of these windings is superimposed upon the standard characteristic curve.

The transformer means 20 is divided into two separate and distinct transformers A, B. Transformer A is associated with the current pulse in the A direction, primary winding 22 and secondary winding 42. The second transformer B is driven by current pulse flowing in direction B and includes primary winding 24 and secondary winding 44. These two distinct transformers are interconnected at their secondaries as previously described. The cores 30, 32 are different cores and are not inductively coupled. This avoids saturation as was inherent with tightly coupled transformer windings on the same core. In the past, if the pulse timing between current flow in direction A and current flow in direction B is not precise and equal, the tightly coupled transformer design would build up volt-second energy. Since this energy is not equal in the two directions A, B when using a single core, saturation would result. This was due to the fact that the primary windings mounted on the same core were low impedance windings. Consequently, small D.C. voltage components caused by the unbalance between current in direction A and current in direction B caused a Large D.C. current to flow through the primaries. This high current flow resulted in a very high product of ampere turns and forced substantial D.C. flux into the transformer. Such flux saturated the transformer core caused inefficiencies. Even with the current mode control scheme and precise transformer operation attempted in the past, there was a difficulty experienced with respect to saturation of the core used to produce current pulses of the opposite polarities at the secondary output circuit of the transformer means 20. This difficulty has been overcome by a reset circuit, not shown. To accomplish this objective, a reset circuit is used having an inductor and resistor in parallel and, in turn, in series with separate series connected reset windings. These separate windings were added to cores 30, 32, respectively, and were then coupled through the reset circuit. When current is flowing through transformer A identified as direction A, a voltage is induced on the opposite reset. This voltage causes a current to flow through the reset circuit. This reset current flow is conducted through the opposite reset winding causing flux in transformer B which is in the opposite direction than that induced when the primary switches S3, S4 are conductive to cause current flow B through primary 24. This action of the reset circuit resets the flux of core 32. The inductor and resistor of the series connected reset circuit limit current flow in the event that the core of either transformer A or transformer B become saturated or in the particular instance where other operating conditions cause the voltage in the reset circuit to be other than the induced voltage on one of the opposite reset windings.

In the illustrated embodiment, the combined output of the boost circuits, including windings 200, 202 is provided with a large inductor 250 between common junction 252 and welding station W. Choke or inductor 250 is a steel core choke with a relatively large inductance, such as 15.0 mH. This large inductance regulates the background current for the welding operation in a smooth manner. Consequently, power supply or inverter 10 is capable of very high speed modulation of the welding current, while maintaining a substantially constant minimum background current caused by energy from the boost windings 200, 202. These windings maintain energy stored in large inductor 250. The inductance in the main welding circuit is extremely low. This low inductance in the main welding circuit has the disadvantage of increasing the propensity for the welding circuit to be shifted into discontinuous conduction at low currents or low voltages. To obtain the necessary advantage of a fast response time and essentially instantaneous shifting of the current flow across the work station, a low inductance is required for the secondary portion of transformer means 20 as fed through the primary power sources diodes 60, 62. Inductor 250 maintains a minimum background current which is essentially greater than about 25 amperes, and preferably about 35 amperes. The problem of discontinuous conduction in the welding operation is especially predominant when the arc plasma being regulated is at low current, such as during the background time of a pulse arc or short circuit welding process. The large inductive reactance of inductor 250 allows current flow to be maintained even when the main welding circuit is not conducting current to the welding operation.

Reactors 80, 250 in practice are sized such that the background current from the circuit including inductor 250 maintains approximately 35 amperes in a 25 volt static load. In practice, choke 80 is 0.015 mH and choke 250 is 15.0 mH. As the load voltage increases, the background current decreases. In a like manner, as the load voltage decreases, the background current rises. In all cases, modulation of the primary switches S1–S4 will control the current level; however, the split of current between the main welding circuit of diode 60, 62 and the background current through inductor or choke 250 is dependent upon load voltage and is not controllable, with the exception of choosing the relative reactor impedance values. As previously described the unidirectional devices 210, 212 are preferred; however, these devices could be SCRs which would allow controlled deactivation of the current provided by boost windings 200, 202 for discontinuing the background current when desired.

Referring now more particularly to FIG. 2 showing control circuit 300 having several elements functioning as previously described and labeled in accordance with the previous description. Circuit 300 is employed for controlling the voltages across capacitors C1, C2 by adjusting the respective input command signals 100b, 102b. The individual and separate sections of the inverter are designated by blocks 310, 312 with the first block being employed to create current pulse A upon operation of switches S1–S2. The second stage 312 of the inverter is employed for the purpose of controlling the current pulse in direction B during operation of switches S3–S4. The individual stages 310, 312 incorporate the switches and the input capacitor C1, C2 for the purpose of driving the secondaries to create current flow through diodes 60, 62 as explained in connection with FIG. 1. In accordance with the preferred embodiment of the invention, the stages 310, 312 are identical; therefore, only stage 310 will be described in detail and this description will apply equally to the stage or section 312. A signal indicative of the voltage across capacitor C1 is directed through line 330 to an error amplifier 336. A reference voltage indicative of approximately 50% of the total voltage from the output of rectifier 14 is directed through line 332 to amplifier 336. The output or error signal 334 is indicative of the difference between the voltage signals on lines 330, 332. This error signal in line 334 is directed to the positive input of summing junction 338. The other positive input of this summing junction is the current command signal in line 122. This current command signal is the voltage which heretofore would be directed to the two pulse width modulators 320, 320a. When the 40 kHz clock of line 112 toggles flip/flop 110, the current pulse is first directed through the pulse width modulator 320 to stage or section 310. During the next half cycle of the clock 112, a signal is applied by line 102a to the second stage 312 at pulse width modulator 320a. Consequently, the timing signals in line 100a, 102a are out of phase by 180° and occur each 20 kHz. The width of the current signal is determined by the voltage on lines 100b, 102b. These voltages are controlled by the desired current command signal on line 122 as modified by the error signal on lines 334, 334a. Consequently, error amplifier 336 attempts to drive the capacitor in section 310 to the desired voltage. This voltage would be approximately one half of the total voltage across the output of rectifier 14. Since the capacitors have a natural inverse relationship with respect to voltage, control of the voltage on capacitor C1 also controls the voltage across the capacitor C2. In accordance with the preferred embodiment of the invention, the second capacitor is also positively driven by the signal on line 334a. This is a duplicative control circuit for the purpose of trimming the function of circuit 300 as shown in FIG. 2 to accomplish the objective of rendering capacitor C1, C2 generally equal. Generally equal in this context means within approximately 10% of equal division of the voltage at the output of rectifier 14.

In practice the components 338, PWM 100, PWM 102, flip/flop 110 and clock 112 are contained in a digital signal processor; however, such components could be discrete.

Having thus defined the invention, the following is claimed:

1. A high frequency power supply for supplying a welding current through a choke to a welding station including an electrode element and a workpiece element, said power supply including a transformer means for creating a first current pulse in a first secondary winding and a second current pulse in a second secondary winding and means for connecting said secondary windings to pass said current pulses through said choke and across said elements, said transformer means including a first transformer with a first core and means for receiving on said first core said first secondary winding with said first core being magnetized in a first flux direction upon creation of said first pulse, a second transformer with a second core and means for receiving on said second core said second secondary winding with said second core being magnetized in a second flux direction upon creation of said second pulse, said first transformer being operated by a first capacitor means for applying a first voltage to said first transformer upon operation of a first switch means, said second transformer being operated by a second capacitor means for applying second voltage to said second transformer upon operation of a second switch means, a single rectifier for charging said first and second capacitor means to a given total voltage and control means for maintaining said first and second voltages generally equal, said control means including means for creating a first voltage signal indicative of said first voltage, creating a first reference voltage signal comparing said first voltage signal and said first reference voltage signal to obtain a first error signal and adjusting said first pulse in accordance with said first error signal.

2. A power supply as defined in claim 1 wherein said first reference signal corresponds to approximately one half of a known voltage indicative of the desired sum of said first and second voltages.

3. A high frequency power supplying a welding current through a choke to a welding station including an electrode element and a workpiece element, said power supply including a transformer means for creating a first current pulse in a first secondary winding and a second current pulse in a second secondary winding and means for connecting said secondary windings to pass said current pulses through said choke and across said elements, said transformer means including a first transformer with a first core, a first primary winding, and means for receiving on said first core said first secondary winding with said first core being magnetized in a first flux direction upon creation of said first pulse by said first primary winding, a second transformer with a second core, a second primary winding, and means for receiving on said second core said second secondary winding with said second core being magnetized in a second flux direction upon creation of said second pulse by said second primary winding, and supply means for creating said first and second pulses, said supply means including a rectifier with an output voltage, a first capacitor having a first voltage for directing rectified current to said first primary winding, a second capacitor having a second voltage for directing rectified current to said second primary winding, first switch means for controlling the current of said first pulse as supplied from said first capacitor in accordance with a current demand signal, second switch means for controlling the current of said second pulse as supplied from said second capacitor in accordance with said current demand signal and control means for maintaining said first and second voltages generally equal, said control means including means for creating a first voltage signal indicative of said first voltage, creating a first reference voltage signal comparing said first voltage signal and said first reference voltage signal to obtain a first error signal and adjusting said current demand signal in accordance with said first error signal before said command signal controls said first switch means.

4. A power supply as defined in claim 3 including an auxiliary current boosting winding connected to and in series with said first secondary winding and a current control circuit means for connecting said auxiliary winding to one of said welding station elements with said current control circuit means including an unidirectional device poled in the same direction as said first pulse and a current limiting element in series with said unidirectional device.

5. A power supply as defined in claim 4 wherein said current limiting element is an inductor.

6. A power supply as defined in claim 4 including a background inductor in series with said current control circuit of said current boosting winding.

7. A power supply as defined in claim 6 including a second auxiliary current boosting winding connected to and in series with said second secondary winding and a second current control circuit means for connecting said second auxiliary winding to said one station element at a position between said first mentioned control circuit and said background inductor.

8. A power supply as defined in claim 3 including a first auxiliary winding on said first core, a second auxiliary winding on said second core, means for connecting said auxiliary windings to a common junction and an energy storing means between said junction and one of said welding station elements to maintain a minimum welding current flow between said welding station elements in a given direction during operation of said power supply.

9. A power supply as defined in claim 8 wherein said energy storage means is an inductor.

10. A power supply as defined in claim 9 wherein said inductor has a value to maintain at least about 25 amperes of welding current flow.

11. A power supply as defined in claim 3 wherein said first reference signal corresponds to approximately one half of said output voltage.

12. A high frequency power supply for supplying a welding current through a choke to a welding station including an electrode element and a workpiece element, said power supply including a transformer means for creating a first current pulse in a first secondary winding and a second current pulse in a second secondary winding and means for connecting said secondary windings to pass said current pulses through said choke and across said elements, said transformer means including a first transformer with a first core, a first primary winding, and means for receiving on said first core said first secondary winding with said first core being magnetized in a first flux direction upon creation of said first pulse by said first primary winding, a second transformer with a second core, a second primary winding, and means for receiving on said second core said second secondary winding with said second core being magnetized in a second flux direction upon creation of said second pulse by said second primary winding, and supply means for creating said first and second pulses, said supply means including a rectifier with an output voltage, a first capacitor having a first voltage for directing rectified current to said first primary winding, a second capacitor having a second voltage for directing rectified current to said second primary winding, first switch means for controlling the current of said first pulse as supplied from said first capacitor in accordance with a current demand signal, second switch means for controlling the current of said second pulse as supplied from said second capacitor in accordance with said current demand signal and control means for maintaining said first and second voltage generally equal, said control means including means for creating a second signal indicative of said second voltage, creating a second reference voltage signal comparing said second voltage signal and said second reference voltage signal to obtain a second error signal and adjusting said current demand signal in accordance with said second error signal before said command signal controls said second switch means.

13. A power supply as defined in claim 11 wherein said second reference signal corresponds to approximately one half of said output voltage.

14. In a high frequency power supply for supplying a welding current through a choke to a welding station including an electrode element and a workpiece element, said power supply including a transformer means for creating a first current pulse in a first secondary winding and a second current pulse in a second secondary winding and means for connecting said secondary windings to pass said current pulses through said choke and across said elements, said transformer means including a first transformer with a first core, a first primary winding, and means for receiving on said first core said first secondary winding with said first core being magnetized in a first flux direction upon creation of said first pulse by said first primary winding, a second transformer with a second core, a second primary winding, and means for receiving on said second core said second secondary winding with said second core being magnetized in a second flux direction upon creation of said second pulse by said second primary winding, means for creating said first pulse including a first capacitor means having a first voltage and a first switch means for rapidly connecting said first capacitor means across aid first primary winding, means for creating said second pulse including a second capacitor means having a second voltage and a second switch means for rapidly connecting said second capacitor means across said second primary, and control means for maintaining said first and second voltages generally equal, said control means including means for creating a first voltage signal indicative of said first voltage, creating a first reference voltage signal comparing said first voltage signal and said first reference voltage signal to obtain a first error signal and adjusting said first pulse in accordance with said first error signal.

15. A power supply as defined in claim 14 wherein said first reference signal corresponds to approximately one half of a known voltage indicative of the desired sum of said first and second voltages.

* * * * *